United States Patent

[11] 3,550,714

[72] Inventor  Spencer Lawrence Bellinger
              Sunnyvale, Calif.
[21] Appl. No. 405,064
[22] Filed     Oct. 20, 1964
[45] Patented  Dec. 29, 1970
[73] Assignee  Mowbot, Inc.
              North Tonawanda, N.Y.
              a corporation of New York

[54] LAWN MOWER
     10 Claims, 12 Drawing Figs.
[52] U.S. Cl. ........................................... 180/79.1,
                                    56/25.4, 180/91
[51] Int. Cl. ............................................... B62d 5/04
[50] Field of Search .......................................... 180/79.1,
                                    79.2, 77, 82.1; 172/5, 6

[56]        References Cited
         UNITED STATES PATENTS
3,006,129  10/1961  Sayre ........................... 56/25
3,052,076   9/1962  Bambi .......................... 56/25.4
3,128,840   4/1964  Barrett ......................... 180/77
3,242,659   3/1966  Dunlap ......................... 56/25

Primary Examiner—Leo Friaglia
Assistant Examiner—John A. Pekar
Attorney—LeBlanc & Shur ABSTRACT: A fully automatic self-propelled, self-guided device is described operating on the principle of random motion within a boundary. The boundary is established by a signal carried on a conductor and the device includes means for sensing the boundary signal as the vehicle approaches the boundary and control circuitry for steering the device away from the boundary.

PATENTED DEC 29 1970

INVENTOR.
S. LAWRENCE BELLINGER
BY Townsend and Townsend
ATTORNEYS

FIG. 10

LAWN MOWER

The present invention relates in general to a fully automatic self-propelled, self-guiding device and more particularly to a fully automatic, self-propelled lawn mower.

While the present invention is particularly adapted for use as a lawn mower, certain aspects of the invention are equally applicable to other types of machines which are to be operated within a bounded area such as, for example, agricultural equipment and accessories for performing routine agricultural tasks. Therefore, the words "lawn mower" are used hereinafter, wherever applicable, to include other types of machines operable in substantially the same manner.

A number of different lawn mower types have been proposed for operation on an automatic or semiautomatic basis. One proposal has been to remotely control a lawn mower by means of an attached wire or remote control device operated by a person in the general vicinity. The major difficulty with such a device lies in the fact that the necessity for continual observation and guidance has not been removed. One of the alternative structures proposed to avoid the necessity for continual observation is the use of a buried cable formed in a circuitous path and to which a signal is applied so that, with the cable laid out so as to extend to all parts of the area to be mowed, the lawn mower following the path of the cable mows the entire area. Naturally, this latter construction involves considerable expense in providing and burying a cable which the lawn mower is to follow, especially when the area to be covered by the lawn mower is extensive.

A second type of unattended lawn mower construction utilizes a device to sense the difference between cut and uncut grass so that the mower can be operated first manually to encircle the area to be mowed and then positioned on the line between the cut and uncut grass to follow this line in circles of ever decreasing diameter. This type of lawn mower is not effective when there is little difference between the length of the cut and uncut grass, especially in those instances where the grass grows at different rates in different parts of the yard so that when the mower reaches the regions of short grass, it loses its control. Also, the only way for avoiding obstacles accidentally placed in the cutting area is to turn off the machine.

Still another type of unattended lawn mower operation utilizes a fence projecting above the ground which contains the lawn mower within the area to be cut and physically impedes movement of the mower outside the outlined area so that ultimately the lawn within the area will be cut by the mower following a random pattern of travel. The fence projecting above the ground to contain such a mower is both bothersome and unsightly and provides regions at the fence where grass can grow and is difficult to cut. This lawn mower operation also requires fences around all permanent obstacles such as trees, flower beds, shrubs and the like which is not desired from an aesthetic standpoint. Also this system, as with the system operating on the difference between cut and uncut grass can only cope with an obstacle accidentally placed in the cutting area by turning off the machine.

Broadly stated, the present invention, to be described in greater detail below, involves a method of providing a random pattern travel to a fully automatic self-propelled machine with a directing policy of travel near the boundaries of the area to be covered and such a self-propelled machine, which includes means for generating a signal at the boundary of the area, drive means which permit either forward or rearward motion of the machine, a steering means mounted on the machine, means mounted on the machine for detecting the boundary signal as the machine approaches the boundary, means responsive to the detected signal for reversing the direction of travel of the machine when it reaches the boundary, means also responsive to the detected signal for steering the machine toward the normal to the boundary and means for steering the machine in a straight line in the absence of a detected signal.

A fully automatic lawn mower of this nature cuts the area bounded by the generated signal in a random pattern of travel with a specific policy of machine movement for the machine when it reaches the boundary so as to contain the machine within the boundary regardless of the complexity of the shape of the boundary.

In the preferred embodiment of the present invention, the signal is generated in a small wire buried a few inches underground and the lawn mower is provided with a front set and a rear set of pickup coils, the sets of coils operating one at a time to detect the signal from the buried wire. A control circuit is provided for stopping forward motion of the machine when a signal is detected, reversing the direction of the machine and steering the machine toward the normal to the boundary at that point and then, when the signal is no longer detected, steering the machine in a substantially straight line and switching the controlling operation from one set of pickup coils to the other. As a safety feature, provision is made for blocking detection of a boundary signal from any other pickup coil after one pickup coil has initially detected and continues to detect the boundary signal.

In order to permit transportation of the mower into the bounded area or from one bounded area to another, the machine is adapted to be operated by a leash which includes controls for forward and rearward motion as well as right and left steering and which bypasses the sensing coils and logical circuits on the machine.

Of necessity, the fully automatic lawn mower in accordance with this invention is provided with a number of safety features to insure against injury and to maintain the machine within the desired area. In this regard, an additional pickup coil is mounted in the middle of the machine and adapted to detect both the signal which normally operates the other pickup coils as well as a signal of a different frequency, and provision for shutting off the machine when either of these two signals is detected. With this construction, if, for some reason, the machine should pass over the buried boundary cable without the normally operating pickup coils detecting the boundary signal to reverse the machine, the centrally located pickup coil will detect the boundary signal and turn the machine off. Additionally, the boundary signal generating system includes an internal battery and provision for connecting the internal battery to generate the signal of the second frequency in the event power is shut off to the signal generating device whereby when there has been a power failure so as to interrupt the power delivery to the normally operating boundary signal generator and the machine approaches the boundary, the centrally located pickup coil will pick up the signal of the second frequency and again turn off the machine.

Additionally, the lawn mower in accordance with the present invention is provided with a bumper control switch connected so as to reverse the drive direction of the lawn mower when the mower bumps up against a person or an obstacle such as a toy or a tree, and with the additional provision that if the bumper switch is actuated when the boundary signal is being detected, the machine will be turned off in order to avoid the possibility that the machine cannot logically remove itself from the obstacle without escaping over the boundary of the area.

Other necessary safety features are the provision of switches which turn off the machine in the event someone tries to ride on it or when the machine is tilted as well as the provision for turning off the machine in the event the battery condition is discharged, low on water or otherwise unable to support proper operation of the sensing system. In order to control the duration of operation of the lawn mower, provision is also made for a timer or a battery condition switch to energize a homing device such that, after the mower has operated for a sufficient length of time, it will home in on its storage area.

A fully automatic lawn mower of the type in accordance with the present invention is particularly adaptable for close grooming of lawns at frequent intervals such as, for example, every night, so that any fractional percent of the area to be cut utilizing the random pattern of travel will not be likely to grow an appreciable amount before it is cut during the next operation of the mower. Such a machine will not be required to cut high grass and therefore can be operated with a low power source. A particularly advantageous and novel cutting assembly for such a lawn mower includes the provision of a moving metal belt driven over at least a pair of pulleys and provided with small blades for cutting grass. This cutting assembly avoids the normal types of injuries encountered with conventional rotary mowers which often lose portions of or entire blades that fly off and have been known to carry a considerable distance with the capability of fatally injuring persons in the vicinity. The kinetic energy of the belt and small blades is so low that, should it fail, there is no appreciable danger of serious injury resulting.

Other objects of the present invention will become apparent upon reading the following specification and referring to the accompanying drawings in which similar characters of reference represent corresponding parts in each of the several views.

Figure 1:
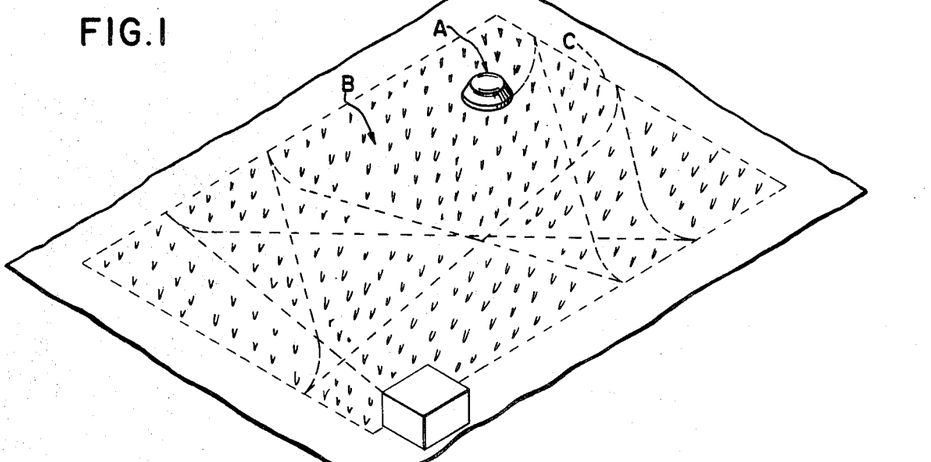
FIG. 1 is a perspective view illustrating the operation of the lawn mower on a lawn to be cut.

Referring now to FIG. 1 of the drawing, there is shown a fully automatic, self-propelled and self-guiding lawn mower A in accordance with the present invention, cutting a lawn B with a random pattern of travel and a proscribed directing policy of travel at the boundary C of the lawn. The boundary C is defined by a cable such as, for example, an insulated wire embedded in the ground and through which is transmitted a boundary signal such as, for example, a 3kc. signal from a signal generator connected to a conventional source such as, for example, a conventional 110-volt power line. The lawn mower, as shown in greater detail in FIGS. 2 and 3, includes a chassis or mounting platform 11 on which a pair of rear, freewheeling idler wheels 12 are mounted by means of an axle 13. A pair of front driving and steering wheels 14 are mounted on the ends of a rotating axle 15. The rotating axle 15 is rotatably mounted in a yoke 16 which is rotated about a vertical axis by means of a steering shaft 17 rotatably mounted such as, for example, by a journal bearing 19, on a mounting plate 18.

Figure 2:
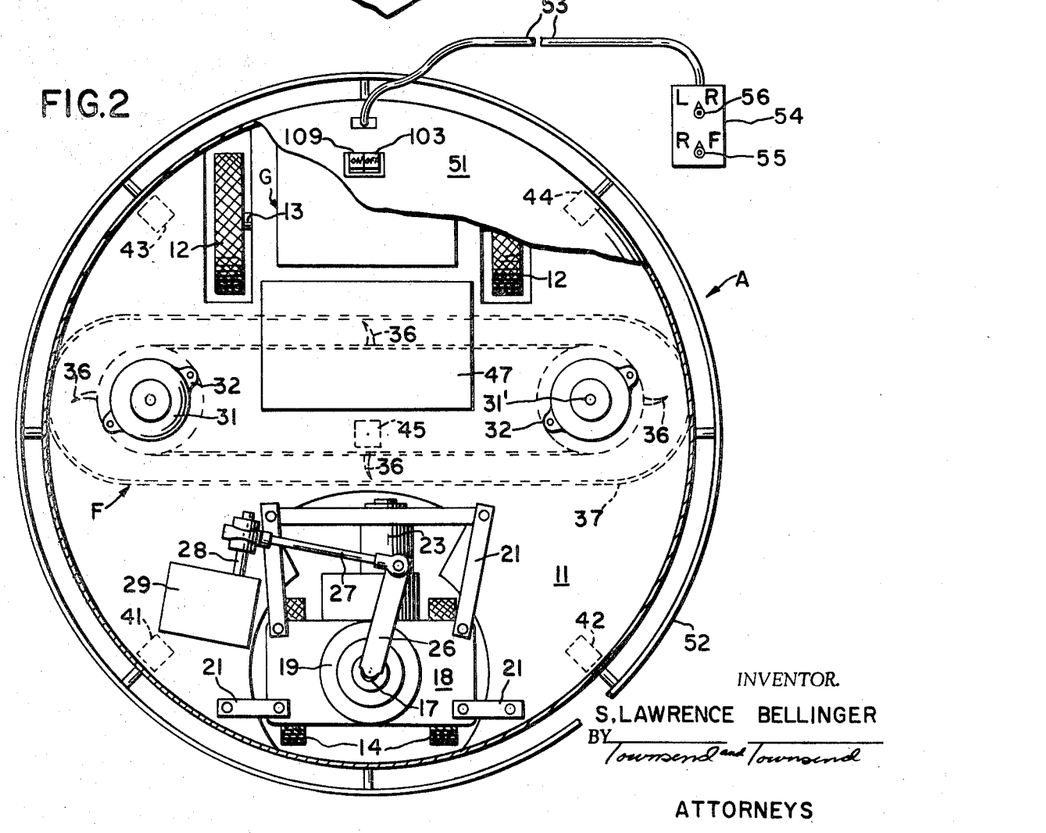
FIG. 2 is a plan view, partially broken away, of a lawn mower embodying features of the present invention.
Figure 3:
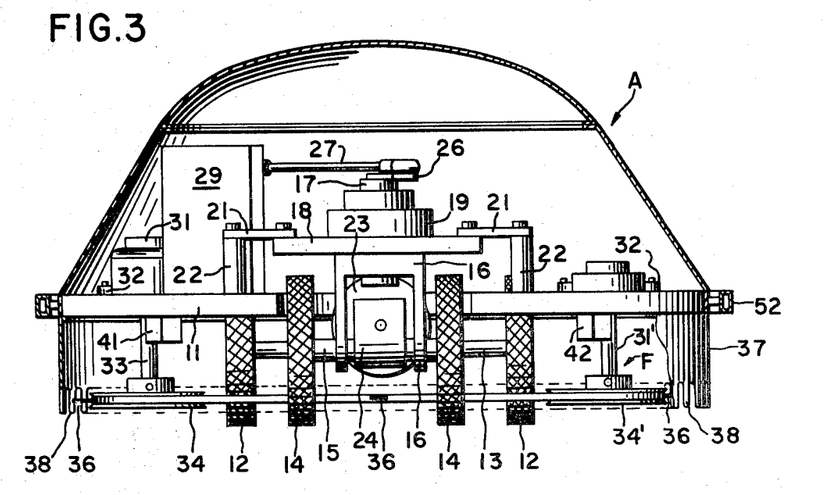
FIG. 3 is a side elevational view of the structure shown in FIG. 2 with the cover partially broken away.

The mounting plate 18 is supported from the chassis 11 by a plurality of brackets 21 which are secured, such as by bolts, to posts 22. The drive assembly D includes a drive motor 23 such as, for example, an electric forward and reverse DC motor, which is mounted on the yoke 16 for transmitting drive power through a transmission 24 to the axle 15 for turning the drive wheels 14.

The wheels 14 are steered to steer the chassis of the lawn mower by a steering assembly E which includes steering arm 26 connected at one end to the shaft 17 and at the other to a linking arm 27 which is eccentrically mounted on the output shaft 28 of the steering motor 29. The cutting assembly F includes a cutting motor 31 and a rotatable idler shaft 31' which are mounted on the chassis 11 via mounting brackets 32 with the shaft 31' and the motor output shaft 33 vertically aligned. Pulleys 34 and 34' positionable by means of set screws are provided at the lower ends of the shafts 33 and 31' respectively at the desired cutting level between the chassis 11 and ground for cutting grass as described in greater detail below. A continuous thin, narrow tape 35 of, for example, steel, is positioned in the grooves of the pulleys 34 and 34' for rotation around the pulleys in response to the rotation of cutting motor 31. A plurality of small cutting blades 36 are mounted on the tape 35 and project outwardly therefrom for cutting grass as the chassis of the lawn mower A moves over the lawn B. Beneath the chassis 11, a cutting guard 37 is provided around the cutting assembly F, and this guard 37 includes adjacent its lower edge a series of closely spaced fingers 38 which permit passage of blades of grass therebetween but which prevent passage therethrough of foreign objects such as sticks, fingers, etc.

The lawn mower A is also provided with a control assembly G for controlling the drive assembly D, the steering assembly E and the cutting assembly F, the wires leading from the control assembly G to the various operating assemblies being omitted for clarity of illustration. This control assembly G includes right and left front pickup coils 41 and 42 respectively and right and left rear pickup coils 43 and 44 respectively, each of which is paced around the circumference of the chassis 11 from the next adjacent pickup coil by 90° of arc. While the coils can be oriented with their axes vertical, horizontal or therebetween the coil axes are preferably oriented at a 45° angle with the bottom of the platform 11 directed toward the center of the machine. Additionally, a central pickup coil 45 is mounted substantially on the vertical axis of the chassis 11. Power is provided to the control assembly and all other operating assemblies from a source such as, for example, a low voltage DC battery 47.

A cover 51 is provided on top of the chassis 11 for enclosing the operating assemblies and a circuit breaking bumper 52 is provided around the periphery of the chassis operable in a manner described in greater detail below.

Figure 5A:
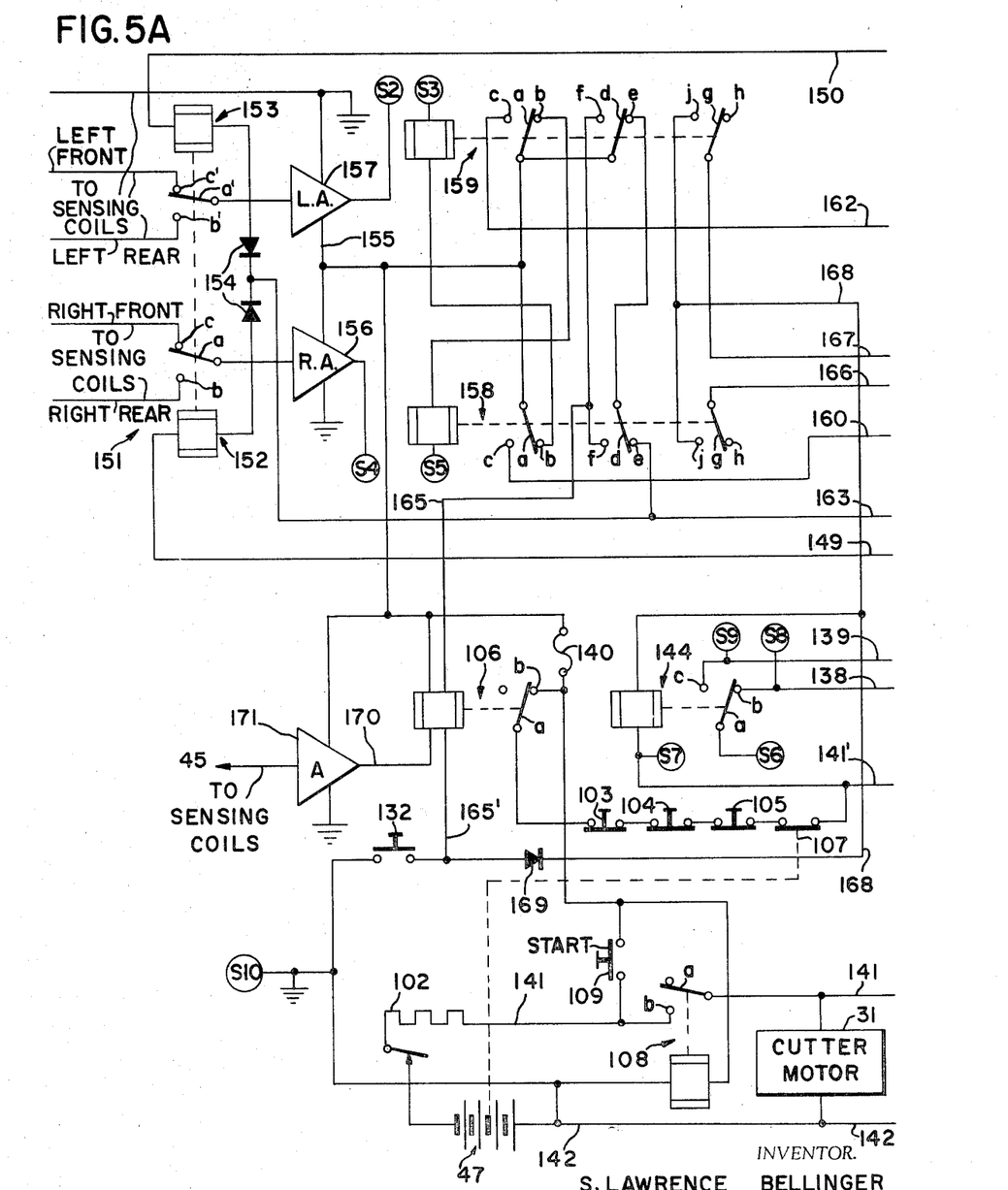
FIG. 5A, 5B and 5C are wiring diagrams illustrating the circuit for a typical lawn mower embodying features of the present invention.
Figure 5B:
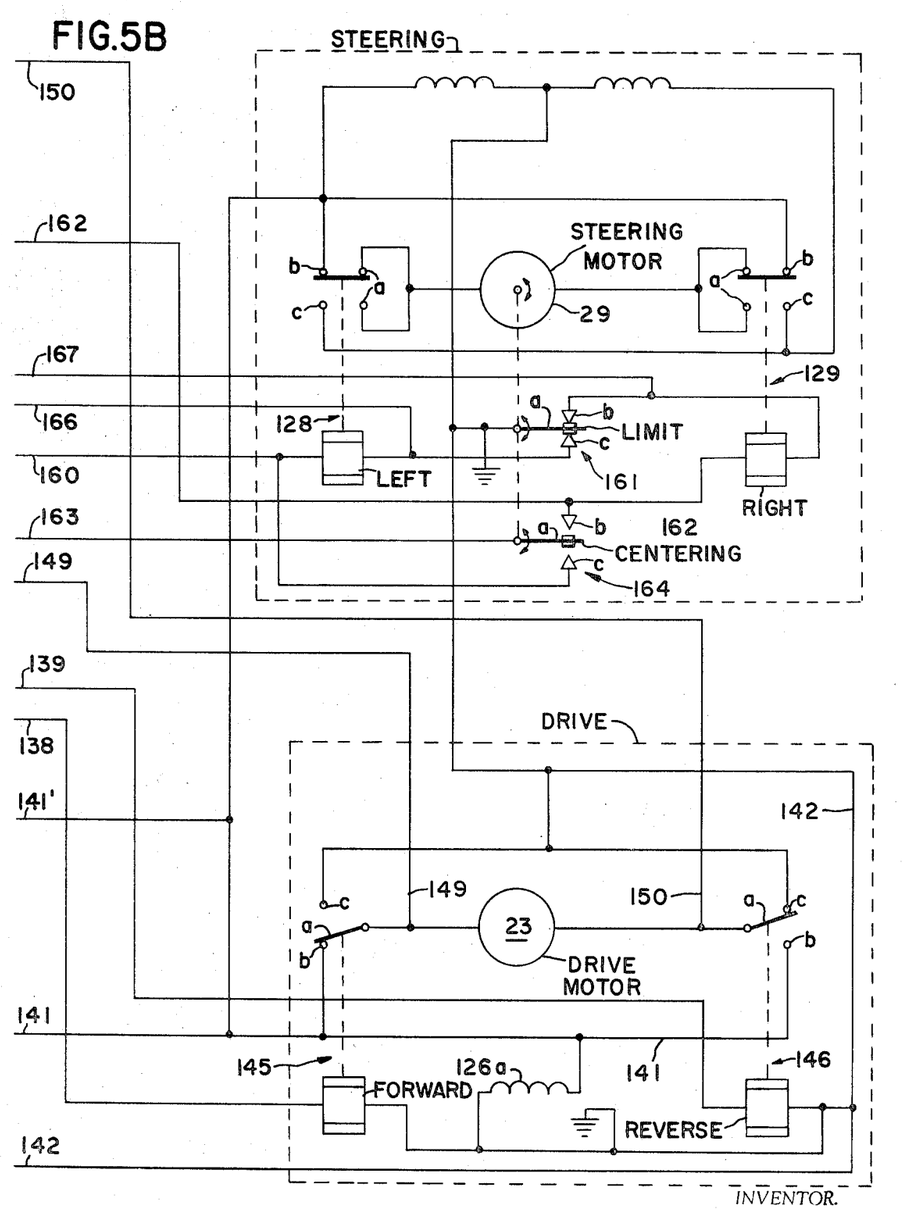
Figure 5C:
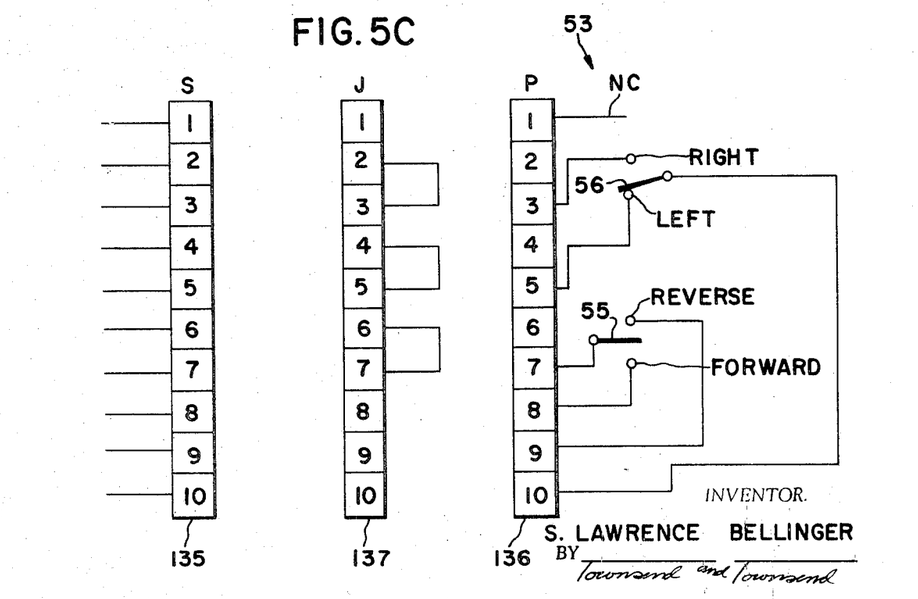

For manually directing the automatic lawn mower from one enclosed boundary area to another is a plug-in leash 53 provided on the end thereof with a control box 54 having a drive control knob 55 operable from positions "forward," "reverse" and "neutral" and a steering control knob 56 operable from positions "right," "left" and "neutral." The leash 53 is plugged into a switch box 135 illustrated in FIG. 5C which has 10 plug receptacles designated S1-S10 which receive plugs designated P1-P10 of the leash plug 136. When the leash plug 136 is removed from switch box 135, a jumper plug 137 is substituted which has plugs designated J1-J10 with plug J2 joined to plug J3, plug J4 joined to Plug J5, and plug J6 joined to plug J7.

Figure 4:
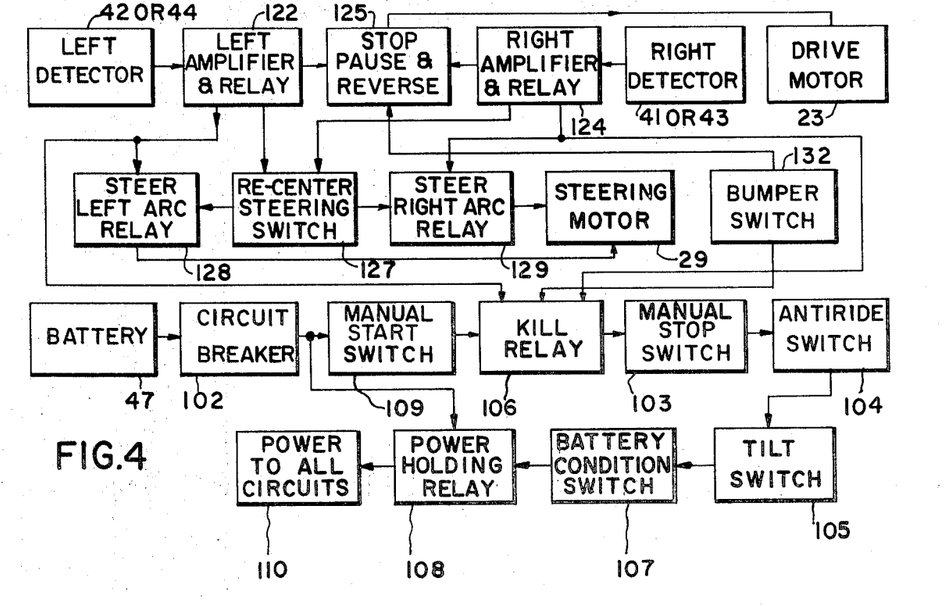
FIG. 4 is a block diagram illustrating the operation and association of particular elements in the typical control elements of the lawn mower.

Referring now to FIG. 4, there is shown a block diagram of the major components in the control assembly and their connection with one another. The battery 47 is connected through a circuit breaker 102, to power holding relay 108 to provide power to all circuits as indicated at 110. The circuit breaker 102 is also connected through a manual start switch 109, a kill relay 106, a manual stop switch 103, an antiride switch 104, a tilt switch 105 and a battery condition switch 107 to the other side of power holding relay 108. Depending upon the direction of motion of the mower, either the front left or rear left coil, 42 and 44 respectively, is connected through a left amplifier and relay 122 to a stop, pause and reverse circuit 125 for controlling the drive motor 23. Similarly, either the front right or rear right pickup coil, 41 and 43 respectively, is connected through a right amplifier and relay circuit 124 to the circuit 125. The amplifier and relay assemblies 122 and 124 are also connected respectively to left and right arc steering relays 128 and 129 and to a recentering steering switch 127 which is in turn connected to the arc steering relays 128 and 129. The kill relay 106 is connected to the relays 122 and 124 as well as to a bumper switch 132 which is also connected to the stop, pause and reverse circuit so that upon bumping an object the machine will either reverse itself in the absence of a boundary signal or kill itself in the presence of a boundary signal.

Referring now to circuit diagrams FIGS. 5A, 5B and 5C, power is supplied to the whole machine from the battery 47 through a main positive bus 142 which is grounded. Naturally using transistor diode arrangements other than those shown, a negative ground could be utilized. A main negative bus 141 is connected through contacts 108a and 108b of the power holding relay 108 and the circuit breaker 102 to the negative terminal of the battery. The start switch 109 is connected to the bus 141 and to ground through the coil of relay 108. By closing the start switch 109 momentarily, a potential difference is established across the coil of relay 108 thereby closing contacts 108a and 108b of the negative bus 141 so that negative voltage now appears on the main negative bus 141 and continues to hold the relay 108 closed due to negative voltage from the negative bus 141 via line 141' through series switches 107, 105, 104, 103 and contacts a and b of the kill relay 106. If any one of these series switches is open, the machine will be turned off, but if they are all closed, the machine will operate.

Connected between the positive and negative buses 142 and 141 are the cutting motor 31, the field 126a of the drive motor 23. One end of the coil of forward and reverse drive relay 144 is connected to bus 141'. The relay 144 is provided with fixed contacts b and c which are respectively connected via lines 138 and 139 respectively through forward and reverse drive relays 145 and 146 respectively to ground for operation of the drive motor 23. The movable contact a of the forward and reverse relay 144 is connected through S and J6 and 7 (see FIG. 5C) to the negative bus 141. Each of the drive relays 145 and 146 is provided with a movable contact a connected to the drive motor 23, a fixed contact b connected to the negative bus 141 and a fixed contact c connected to the positive bus 142.

The movable contacts 145a and 146a are connected via lines 149 and 150 respectively to opposite sides of a latching relay 151 which includes coil portions 152 and 153 for respectively connecting either the front pickup coils 41 and 42 via the fixed contacts c and c' or the rear pickup coils 43 and 44 via the fixed contacts b and b' into the control circuitry via movable contacts a and a'. Coils 152 and 153 are connected by a common line through diodes 154 to line 163. The contacts a and a' are respectively connected through the right and left signal amplifiers 156 and 157 which connect the detected signals via switch contacts S and J 4 and 5 or S and J 2 and 3 respectively to right and left control relays 158 and 159.

Each of these control relays 158 and 159 includes movable contacts a, d and g which respectively are movable between fixed contacts b and c, e and f, and h and j. Movable contacts a are connected to the line 155 extending between the amplifiers 156 and 157 and connected through fuse 140 contacts a and b of kill relay 106 and through switches 103, 104, 105 and 107 is negative bus 141'. Fixed contacts 158b and 159b and respectively connected to the coil of the opposite relay 159 and 158 respectively. Fixed contact 158c is connected via line 160 through the left arc steering relay 128 to one contact 161c of the cam-operated limit switch 161 on the drive shaft of the steering motor 29. Fixed contact 159c is connected via line 162 through the right arc steering relay 129 to limit switch contact 161b. The movable limit switch contact 161a is connected to ground via the positive bus 142. The movable contact 158d is connected to the fixed contact 159e while the movable contact 159d is connected to the movable contact 159a. Fixed contact 158e is connected to a line 163 which joins the cathodes of diodes 154 to the movable contact 164a of a centering switch 164 which includes fixed contacts b and c respectively connected to lines 162 and 160.

Fixed contacts 158f and 159f are connected via line 165 through the coil of kill relay 106 to positive bus 142 via the bumper switch 132. Movable relay contacts 158g and 159g are respectively connected via lines 166 and 167 to limit switch contacts 161c and 161b respectively. Fixed relay contacts 158j and 159j are connected via line 168 to the coil of relay 144. Bumper switch 132 is also connected through diode 169 to line 168.

The machine operates as follows. Assuming that contact is made between contacts 144a and 144b with the start switch closed momentarily to operate the power holding relay 108 as described above, negative voltage is connected through S and J 6 and 7 to the forward drive relay 145, thus closing contacts 145a and 145b as shown. This places negative voltage at contact 145a on one side of the drive motor while contact 146a on the opposite side of the motor is grounded through contact 146c so that the drive motor 23 runs in the forward direction.

Double acting relay 151 determines that the front pickup coils 41 and 42 are connected when the machine is moving forward. This is a mechanical latch relay, the position of which is determined by the polarity of voltage on the drive motor through lines 149 and 150. As shown in the drawing, movable contacts a and a' are connected to fixed contacts c and c' in this double-acting relay 151.

When no command signal is being received from the pickup coils 41 and 42, the control relays 158 and 159 are not energized so that the movable contacts a, d and g in each of these relays are connected as shown in the drawing.

When the lawn mower approaches the border wire C with the left front side of the mower closest to the border, a border signal is picked up by the left front pickup coil 42. This signal is fed to the left signal amplifier 157, through S and J 2 and 3 to the left control relay 159 to close its movable contacts a, d and g with fixed contacts c, f and j respectively. As contacts 159d and 159e open, voltage is removed from the movable contact 164a of the centering switch 164. Since movable contact 159g is connected via line 167 to ground through the limit switch 161, the forward and reverse relay 144 is energized when contacts 159g and 159j close. This relay 144 is a flip-flop relay which transfers the movable contact 144a from the fixed contact 144c to the fixed contact 144b and vice versa each time that it is energized and released. However, during the time it is energized, movable contact 144a is in a neutral position where there is no connection either to fixed contacts 144b or 144c. Thus, as long as forward and reverse relay 144 remains energized, current to forward and reverse drive relays 145 and 146 is interrupted to open the connection between contacts a and b in each of these latter relays to stop the drive motor 23. Since line 168 is positive with respect to line 165' at this time, operation of kill relay 106 is prevented by diode 169.

Again, when left control relay 159 is closed, negative voltage is furnished through contacts 159a and 159c and line 162 to the right arc steering relay 129 to close contacts 129a and 129c thereof and drive the steering motor 29 in a clockwise direction as viewed in FIG. 5B. When the steering motor has reached the end of its arc, contacts 161a and 161b of limit switch 161 are opened to deenergize the steering relay 129 and stop the steering motor. This also removes ground potential from forward and reverse relay 144 via line 167, 159g, 159j and line 168 which releases movable contact 144a so as to close contacts 144a and 144c. This puts negative voltage on reverse drive relay 146 via line 139 to close contacts 146a and 146b thereof so that the drive motor runs in the reverse direction while the steering is in the full clockwise position. As long as left control relay 159 remains energized, contacts 159a and 159b remain open so that relay 158 is blocked due to the lack of negative supply potential. Also, as long as control relay 159 remains energized, the steering remains in the full clockwise position. Under this condition, due to the cam action of the steering motor 29, the limit switch contacts 161a and 161b which ground steering relay 129 are open, the limit switch contacts 161a and 161c which ground left arc steering relay 128 are closed, and the movable contact 164a of centering switch 164 is closed with fixed contact 164c.

Even though the machine is now running in reverse, the double acting relay 151 has not yet changed position and the front pickup coils 41 and 42 are still connected to the amplifiers 156 and 157. This condition must persist until the border signal disappears.

When the lawn mower has backed out of the signal area, left control relay 159 is deenergized so that negative potential is connected through contacts 159d and 159e through 158d and 158e, and through contacts 164a and 164c to energize left arc steering relay 128. This causes the steering motor 29 to turn counter clockwise until the centering switch 164 breaks contacts 164a and 164c, and the steering motor 29 then remains in its center position to steer the lawn mower in a straight line until the next border signal is received.

When left control relay 159 is deenergized, negative voltage is again supplied through diodes 154 to coils 152 and 153. Since coil 152 is now grounded through contacts 145a and 145c, coil 152 is now energized to connect contacts 151a and 151a' to contacts 151b and 151b' respectively so that the rear pickup coils 43 and 44 are now connected to the amplifiers 156 and 157.

This description completes one cycle of normal operation of the lawn mower when it approaches the boundary. As can be seen from the above, the lawn mower is always turned toward the normal to the boundary where the lawn mower meets the boundary. It has been discovered that with this policy of direction at the boundary, the situation in which the logic circuit used to control the lawn mower can get confused is eliminated and the lawn mower is contained within the boundary.

The kill relay 106 is a dual coil, dual function relay used in such a manner that, upon energization either from line 165 from the bumper switch 132 or line 170 from the kill amplifier 171 contacts 106a and 106b are broken to deenergize the power holding relay 108 and turn the lawn mower off.

Consider first the operation of the bumper switch 132. If a tree, chair, toy or other obstacle is touched by the machine, the bumper switch 132 closes. This grounds the forward and reverse relay 144, via diode 169 and via line 168 and immediately actuates relay 144 to reverse the drive motor 23, assuming that no border signal is being received at the time. The closure of the bumper switch 132 also grounds line 165' to one coil in the kill relay coil 106, but if there is no negative voltage on the opposite end of this coil from line 165, nothing happens. However, if the machine experiences a bump while it is in a signal area, it cannot logically extricate itself without risk of escaping over the border. Therefore, it is necessary that the lawn mower immediately turn itself off until the condition is corrected. Thus, if either of the right or left control relays 158 and 159 is pulled down, negative voltage is applied via line 165 to that one coil of the kill relay 106 so that when the opposite side of the coil in the kill relay 106 is grounded by the bumper switch 132, contacts 106a and 106b of the kill relay 106 open thereby to release the holding voltage on relay 108 and break contact between holding relay contacts 108a and 108b to turn off the entire machine.

The input signal for the kill amplifier 171 is derived from the central pickup coil 45 mounted in the center of the machine. This amplifier will respond to the normal border signal of, for example, 3kc. and a second signal of, for example, 11kc. while the front and rear pickup amplifiers 156 and 157 respond only to the 3kc. signal. If for any reason the front and rear pickup coils fail to reverse the machine while a normal border signal is present, the center pickup will activate the kill amplifier 171 to energize via line 170 the other coil of kill relay 106, thereby to turn off the machine.

The border control unit contains a safety device utilizing a small internal battery (not shown) and a relay (not shown) controlling connection between this battery and the signal generator for generating the 11kc. signal. This relay is connected in the main power line to the border control signal generator so a power line failure deenergizes the relay to connect the internal battery to the 11kc. signal generator. This same relay action changes the frequency generated by the border control unit from 3kc. to 11kc. If the lawn mower is operating within the bounded area A during the power failure, the machine will be turned off by the kill relay 106 the first time that the machine encounters the boundary and the 11kc. signal is picked up by coil 45.

As an additional safety precaution to avoid escape of the lawn mower when power is applied to the border wire but for some reason the border wire circuit is broken, a low current DC voltage alarm circuit is provided which includes means for applying a low current DC voltage around the border wire loop and provision for actuating the 11kc. signal to shut off the machine when no DC is present.

This low current DC voltage is preferably no more than 10 volts and the signal power for the 3kc. border signal is preferably less than 2 watts for a wire surrounding a 1,000 square foot area so that there is insufficient power in the wire to injure a person if the wire is accidentally cut.

The antiride switch 104 will open the main circuit to shut off the machine if anyone tries to ride the lawn mower and the tilt switch 105 will open to shut off the machine if the lawn mower is tipped beyond a predetermined angle from the horizontal. The battery condition switch 107 will open to shut off the machine if the battery is discharged or low on water or in any other condition so as to be unable to support proper operation of the sensing system.

The amount that the lawn mower is turned when it encounters the field set up by the boundary wire depends upon how long the detecting relay remains in the field of the boundary wire. Thus, when the mower approaches a boundary at a slight angle, it will remain in the field for a longer time and thus turn the mower through a longer arc than when approaching the boundary more normal thereto. Depending upon the angle at which the border is approached, the machine may or may not turn beyond the normal to the boundary where the machine reverses direction. It has been discovered that where the machine is to operate in narrow corridors such as, for example, a machine (32 inches) in diameter that must operate in corridors 8 feet wide, the net turn accomplished should be in excess of 45°. In large open areas with no pockets or corridors this limitation does not apply, and a turn of a few degrees will suffice.

When the machine approaches the boundary substantially normal thereto either the right or left pickup coil will detect a signal depending upon which pickup train reaches its threshold level first, and the machine will turn accordingly when it leaves the boundary.

The operating circuit for the leash 53 is shown in FIG. 5C. With the leash plug 136 substituted for the normal jumper plug 137, amplifiers 156 and 157 are disconnected from right and left control relays 158 and 159 which are now operated by the control knob 56 which provides ground potential to either contacts P3 or P5 for turning right or left respectively. Similarly, forward and reverse drive relays 145 and 146 are operated by the control knob 55 which provides negative potential to either contacts P8 or P9 for moving forward or reverse respectively. Contacts S1, J1 and P1 are not connected to any portion of the circuit but provided for accessories to the machine.

Figure 6:
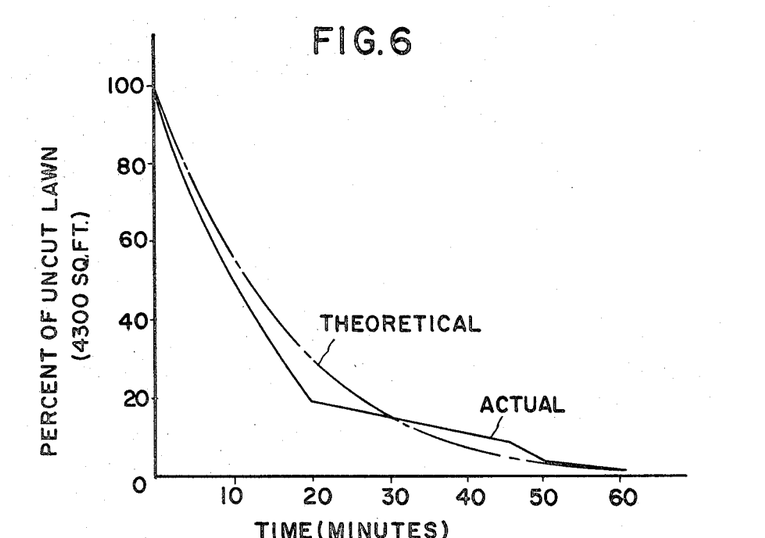
FIG. 6 is a graph of percent of uncut lawn plotted versus time, showing actual and theoretical plots for cutting operations performed with random pattern travel of the type in accordance with the present invention.

FIG. 6 shows one plot of the percentage of uncut lawn in a rectangular lawn area roughly 60 feet by 72 feet or 4300 sq. ft. plotted against the time in minutes during which a lawn mower in accordance with the present invention was cutting the lawn with the random motion policy and the boundary reversal policy described above. A curve is shown for theoretical operation and a curve for the actual operation of one machine constructed in accordance with the invention.

The equation for the amount of cut grass for a truly random motion is:

$$1 - e^{-x}$$

A where $x$ equals the area covered by the machine divided by the area of the lawn. Thus, $e^{-x}$ is the fraction of the area remaining uncut. In the example illustrated, the machine was traveling 2 feet per second and was cutting a path 2 feet wide.

The average man mows a lawn at approximately 40 inches per second.

As an additional feature of the present invention, the lawn mower can be stored in a storage shelter 71 shown in FIG. 1, and operated fully automatically so that at the end of the cutting operation, the lawn mower homes in on the storage shelter 71 and parks itself by plugging itself in to a battery recharging apparatus. One means for accomplishing the automatic return of the lawn mower is to connect a timer or the battery condition switch 107 to a photocell located in a tube on top of the lawn mower facing forward. When the lawn mower has either been operating for a given length of time or the condition of the battery reaches a particular level indicative of the time which it has been operating, the battery condition switch 107 can connect the photocell into the control circuitry which includes a chopped light detector and means for operating the steering motor with the right and left arc steering relays to maintain a chopped light signal received from a light on top of the dog house at a maximum. In this manner, the lawn mower will drive itself directly into funnel tracks in the dog house and be guided so as to engage a pair of contacts in a funnel receptacle which break the drive circuit to stop the machine and recharge the battery.

As an additional feature of the present invention, the lawn mower can be provided with means for driving the lawn mower around the boundary of the lawn when the cutting operation is complete to make certain the lawn is evenly cut at the edges. This feature of the invention is accomplished by using the timer or battery condition switch mentioned above with respect to the photocell return mechanism to switch operation of the steering mechanism from that described above to a circuit which causes the lawn mower to straddle the boundary and follow the cable at the boundary, again by steering the lawn mower to pick up the maximum boundary signal. By providing a marker at the boundary, the lawn mower can be provided with circuitry for straddling the boundary to encircle the lawn a given number of times such as, for example, twice and then either shut off or home in on the dog house 71 such as in the manner described above.

Obviously the lawn mower can be operated with two border pickups, one on each side of the machine, instead of the four described and illustrated above. However, the four pickup system is much more reliable. The difficulty with the two pickup system, as with many other systems tested, lies in the fact that there is greater opportunity for the machine to cross a portion of the border and escape while it is turning and picking up a signal. By way of example, in one lawn mower utilizing the present invention, the cutting assembly included small cutting blades one inch in length, mounted on a continuous steel tape driven by a 1/10 the horsepower electric motor. Obviously, other cutting mechanisms can be utilized such as, for example, a rotating steel band provided with cutting blades and traveling in a circle near the outside of the machine or any cutting reel type arrangement.

Other drive mechanisms can also be utilized for driving the lawn mower. For example, instead of having driven front wheels, the rear wheels can be driven and the front wheels moved for steering the lawn mower.

Figure 7:
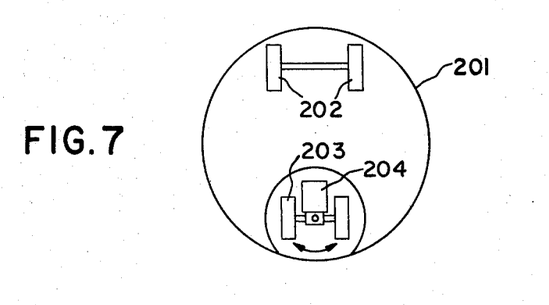
FIG. 7 is a schematic view of an alternative construction of a lawn mower in accordance with the present invention.

Still another steering and drive mechanism, as illustrated in fig. 7, is the provision of a lawn mower 201 substantially similar to that illustrated in FIGS. 2 and 3 having rear idler wheels 202 and front drive and steering wheels 203 but with provision for rotating the driving and steering wheels 203 through 360°, thereby avoiding the necessity for reversing the drive motor. In this construction the steering mechanism is connected through circuitry for producing the same movement at the boundary as described above but by turning the front wheels around in order to head backward instead of reversing the drive.

Figure 8:
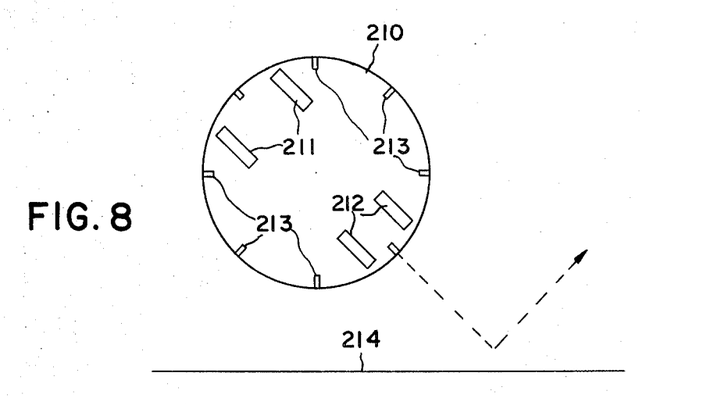
FIG. 8 is a schematic view of another lawn mower in accordance with the present invention.

Still another driving and steering mechanism is illustrated for a chassis 210 in FIG. 8 and includes rear driving wheels 211 and front steering wheels 212 and a plurality of closely spaced pickup coils 213 around the circumference of the chassis. The number and sensitivity of the coils 213 is sufficient to detect a gradient in the border signal field so that when the signal is initially detected, the machine can be slowed down and, with the aid of steering circuitry logic tell how it is approaching the boundary and be turned away from the boundary. Naturally, this system requires a greater number and more sensitive pickup coils than that illustrated in FIGS. 2 and 3 and necessarily requires more power.

Figures 9, 10:
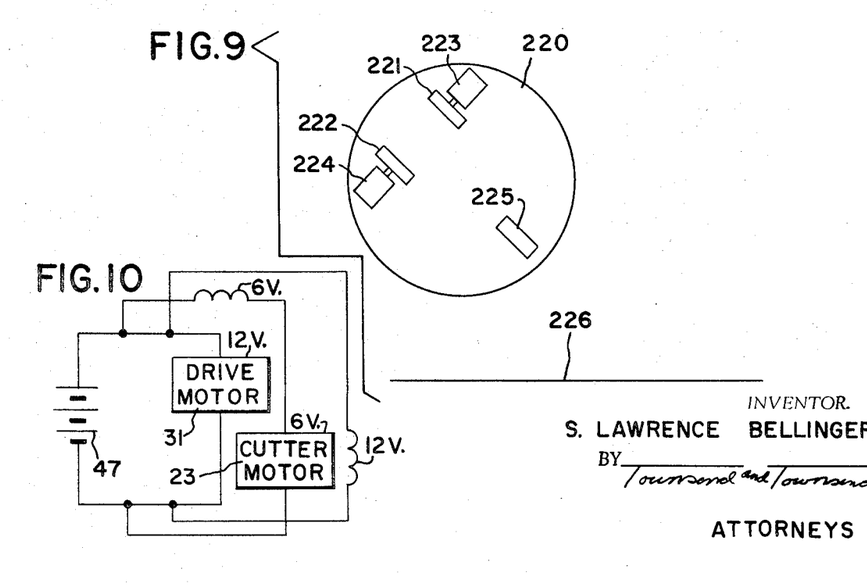
FIG. 9 is a schematic view of still another lawn mower in accordance with the present invention.
FIG. 10 is a schematic circuit diagram for a modified circuit.

Still another driving and steering arrangement is illustrated in FIG. 9 in which the lawn mower chassis 220 is provided with rear wheels 221 and 222 which are individually driven by drive motors 223 and 224. A single front pivotally mounted wheel 225 permits movement of the chassis in any direction determined by the driven rear wheels 221 and 222. When the lawn mower approaches the boundary 226, both driving motors 223 and 224 are reversed and the motor furthest from the border wire held until the other motor drives the activated signal pickup coil out of the field of the boundary wire. The difficulty with this type of an arrangement over that illustrated in FIGS. 2 and 3 lies in the requirement for two drive motors. Obviously, one drive motor could be used with a differential between the wheels and brake bands on the wheels for holding the individual wheels during the turning operation.

Typically, the lawn mower will encounter considerable variations in cutting load, due to variations in texture and rate of growth in different lawn areas. In order to provide most efficient operation, it is desirable to vary the drive speed of the machine as a function of the cutting load; when the grass is light, the machine proceeds at maximum forward or reverse speed, but when the grass is heavy, the speed is reduced to provide more time for the cutter to perform its function.

This result is obtained as shown in FIG. 10 by connecting the armature of the cutting motor 31 in series with the shunt field of the drive motor 23. When heavy cutting loads are encountered, the cutter armature current increases, thereby increasing the shunt field current in the drive motor. This increased field current will cause the drive motor to slow down. Conversely, when the cutter load is very light, the drive motor shunt field current will be at a minimum, and the drive motor will run at higher speed. The result will be maximum coverage per unit time under light cutting conditions, and maximum cutting efficiency with reduced coverage in heavy cutting situations.

Although the foregoing invention has been described in some detail by way of illustration and example for purposes of clarity of understanding, it is understood that certain changes and modifications may be practiced within the spirit of the invention as limited only by the scope of the appended claims.

I claim:

1. The method of covering a bounded area with a device by a random motion pattern with a dictated policy at the area boundary comprising the steps of: moving the device in a substantially straight line across the area; reversing the direction of said device at the boundary of said area; steering the device toward the normal to the boundary and again moving said device in a straight line after the device leaves the boundary region and until the device again reaches the boundary.

2. The method of covering a bounded area with a device by a random motion pattern with a dictated policy at the area boundary comprising the steps of: moving the device in a substantially straight line across the area; reversing the direction of said device at the boundary of said area; steering the device toward the normal to the boundary as the device moves in the reverse direction away from the boundary region; and again moving said device in a straight line after the device leaves the boundary region and until the device again reaches the boundary.

3. A self-propelled, self-guided machine traveling a random pattern over a bounded area with a detected steering policy in the boundary region of the area comprising: means for generating a signal at the boundary of the area including a conductor located at the boundary of the area, means operative with electrical energy from a source for generating an electrical signal of a given frequency along said conductor and means responsive to interruption of electrical energy from said source for generating an electrical signal of an other frequency along said conductor; a machine chassis; drive means mounted on said chassis for driving said chassis over said area and including drive wheels and means for driving said wheels to drive said chassis in a forward or reverse direction; steering means mounted on said chassis for steering said chassis during movement over said area and including at least one steering wheel and means for turning said steering wheel; control means for controlling the drive means and steering means; a front pair of spaced apart sensing coils mounted on said chassis for detecting said given signal; a rear pair of spaced apart sensing coils mounted on said chassis for detecting said given signal; means for connecting either said front or said rear pair of coils in circuit with said control means; a central sensing coil mounted on said chassis for detecting either said given frequency signal or said other frequency signal; means responsive to energization of one of said front pair or one of said rear pair of coils for connecting only that coil in circuit with said control means to stop the machine, to steer said chassis toward the normal to the boundary at the stopped machine and then to reverse the driving direction of said driving means; means responsive to the deenergization of said coil for recentering said steering means for steering said chassis in a straight line and for disconnecting the connected pair of said coils and connecting the disconnected pair of said coils to said control means; cutting means mounted on said chassis including at least a pair of spaced apart pulleys, a cutting drive motor connected to at least one of said pulleys, a continuous band mounted over said pulleys and driven by said pulleys, and cutting elements mounted on said band and projecting therefrom for cutting grass; and means responsive to energization of said central coil by said given frequency signal or said other frequency signal for interrupting said driving means and said cutting means to stop machine movement when the machine travels closer to the boundary than for normal steering away from the boundary responsive to operation of said pairs of coils.

4. The method of covering a bounded area with a device by a random motion pattern comprising the steps of; generating a signal at the boundary of said area; moving the device in a substantially straight line across the area; sensing the generated signal as the device approaches the boundary; steering the device away from the boundary; and again moving the device in a straight line after the device leaves the boundary region and until the device again approaches the boundary.

5. The method of covering a bounded area with a device by a random motion pattern comprising the steps of: generating an electrical signal at the boundary of said area; moving the device in a substantially straight line across the area; detecting said boundary signal as the device approaches said boundary; directing the device away from the boundary while detecting said boundary signal; and after the device has been directed away from said boundary again moving the device in a straight line until the device again approaches said boundary.

6. A method for traversing an area defined by a signal radiating boundary-defining means in a random pattern with a mobile unit having propulsion means and signal responsive steering means comprising the steps of energizing the propulsion means of said mobile unit to move in the direction of a portion of said boundary-defining means, sensing the signals radiated by said boundary-defining means responsive to movement of the mobile unit adjacent to a position thereof, and controlling said signal responsive steering means with said sensed signals to turn the mobil unit away from said boundary-defining means and out of the influence of the signals radiated thereby.

7. A self-propelled guided machine traveling a random pattern over a bounded area with a directing policy of travel near the boundary of the area comprising: means for generating a signal at the boundary of the area; a machine chassis; drive means mounted on said chassis for driving said chassis over said area and including means for driving said chassis in either a forward or reverse direction; steering means mounted on said chassis for steering said chassis for movement over said area; means mounted on said chassis for detecting said boundary signal as said chassis approaches said boundary; driving control means responsive to said detecting means for stopping motion of said chassis at said boundary; and steering control means responsive to said detecting means and said driving control means for operating said steering means to steer said chassis toward the normal to the boundary after said chassis reaches said boundary and stops, and for operating said steering means to steer said chassis in a substantially straight line in absence of a detected signal, said means generating a signal at the boundary of the area including a conductor located at the boundary of the area, means operative with electrical energy from a source for generating an electrical signal of a given frequency along said conductor, and means responsive to interruption of electrical energy from said source for generating an electrical signal of another frequency along said conductor and said detecting means including at least a pair of spaced apart sensing coils mounted on said chassis for detecting said given signal for controlling the steering of the machine when the machine approaches the boundary and a central sensing coil mounted on said chassis for detecting either said given signal or said other signal to stop machine movement when the machine travels closer to the boundary than for normal steering away from the boundary responsive to operation of said pair of coils.

8. A self-propelled guided machine traveling a random pattern over a bounded area with a directing policy of travel near the boundary of the area comprising: means for generating a signal at the boundary of the area; a machine chassis; drive means mounted on said chassis for driving said chassis over said area including means for driving said chassis in either a forward or reverse direction; steering means mounted on said chassis for steering said chassis for movement over said area; means mounted on said chassis for detecting said boundary signal as said chassis approaches said boundary; driving control means responsive to said detecting means for stopping the motion of said chassis at said boundary; and steering control means responsive to said detecting means and said driving control means for operating said steering means to steer said chassis toward the normal to the boundary after said chassis reaches said boundary and stops, and for operating said steering means to steer said chassis in a substantially straight line in absence of a detected signal, said detecting means including a front pair of spaced apart sensing coils mounted on said chassis for detecting said signal, a rear pair of spaced apart sensing coils mounted on said chassis for detecting said signal, means responsive to energization of one of said front pair or one of said rear pair of coils for connecting only that coil in circuit with said driving control means and said steering control means for stopping the machine, for steering the chassis toward the normal to the boundary and for reversing the driving direction of said driving means and means responsive to the deenergization of said coil for recentering said steering means for steering in a substantially straight line and for disconnecting the pair of said coils containing the coil previously energized and connecting the other pair of said coils for detecting said border signal.

9. A self-propelled guided machine traveling a random pattern over a bounded area with a directing policy of travel near the boundary of the area comprising: means for generating a signal at the boundary of the area; a machine chassis; drive means mounted on said chassis for driving said chassis over said area and including means for driving said chassis in either a forward or reverse direction; steering means mounted on said chassis for steering said chassis for movement over said area; means mounted on said chassis for detecting said boundary signal as said chassis approaches said boundary; driving control means responsive to said detecting means for stopping motion of said chassis at said boundary; and steering control means responsive to said detecting means and said driving control means for operating said steering means to steer said chassis toward the normal to the boundary after said chassis reaches said boundary and stops, and for operating said steering means to steer said chassis in a substantially straight line in absence of a detected signal; bumper means mounted on said chassis for contacting objects in the path of the machine; means responsive to contact between said bumper means and such objects for reversing the moving direction of the machine; and means connected to said responsive means and said driving control means for stopping said drive means when a signal is detected by said detecting means and said bumper means contacts an object.

10. Apparatus for traversing an area defined by a signal radiating boundary-defining means in a random pattern comprising a mobil unit having propulsion means, signal responsive steering means on said mobile unit, energizing means for energizing said propulsion means to move said unit in t the direction of a portion of said boundary-defining means, sensing means for sensing the signals radiated by said boundary-defining means responsive to movement of the mobile unit adjacent to a portion thereof, and control means for controlling said signal responsive steering means with said sensed signals to turn the mobile unit away from said boundary-defining means and out of the influence of the signals radiated thereby.